US010431120B2

(12) United States Patent
Long, Jr.

(10) Patent No.: US 10,431,120 B2
(45) Date of Patent: Oct. 1, 2019

(54) TRAINING DEVICE FOR MEDICAL PROCEDURES

(71) Applicant: Boston Scientific Scimed, Inc., Maple Grove, MN (US)

(72) Inventor: Jerry T. Long, Jr., Jamaica Plain, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 585 days.

(21) Appl. No.: 15/175,705

(22) Filed: Jun. 7, 2016

(65) Prior Publication Data

US 2016/0358513 A1 Dec. 8, 2016

Related U.S. Application Data

(60) Provisional application No. 62/172,568, filed on Jun. 8, 2015.

(51) Int. Cl.
G09B 23/32 (2006.01)
G09B 23/28 (2006.01)
G09B 23/30 (2006.01)
G09B 23/34 (2006.01)

(52) U.S. Cl.
CPC ........... *G09B 23/285* (2013.01); *G09B 23/30* (2013.01); *G09B 23/303* (2013.01); *G09B 23/306* (2013.01); *G09B 23/32* (2013.01); *G09B 23/34* (2013.01)

(58) Field of Classification Search
None
See application file for complete search history.

(56) References Cited

U.S. PATENT DOCUMENTS

| 4,726,772 A | 2/1988 | Amplatz |
| 5,620,326 A | 4/1997 | Younker |
| 5,772,442 A | 6/1998 | Lampotang et al. |
| 2011/0287398 A1 | 11/2011 | Blackburn |

OTHER PUBLICATIONS

Printout of User Guide, "Uro-Scopic Trainer," Limbs & Things Limited, www.limbsandthings.com, Issue 6, Jun. 2003, pp. 1-19 (11 pages).
Printout of "EndoUro-Trainer" device available at http://samed-dresden.com/endouro-trainer-112.html, last.accessed on Jun. 2, 2016 (2 pages).
Sep. 7, 2016—(PCT) International Search Report and Written Opinion, App. No. PCT/US2016/036220.

*Primary Examiner* — James B Hull
(74) *Attorney, Agent, or Firm* — Bookoff McAndrews, PLLC

(57) ABSTRACT

A training device for medical procedures may include: a back, a front, a top, a bottom, a left side, and a right side; a track including a main track portion and a plurality of diverting track portions extending from the main track portion, wherein the main track portion extends from a back end proximate the back to a forward end proximate the front; and a stricture device configured to adjust a width of the main track portion along a portion of the main track portion.

10 Claims, 2 Drawing Sheets

TRAINING DEVICE FOR MEDICAL PROCEDURES

CROSS-REFERENCE TO RELATED APPLICATION

This application claims the benefit of priority under 35 U.S.C. § 119 to U.S. Provisional Patent Application No. 62/172,568, filed Jun. 8, 2015, the entirety of which is incorporated herein by reference.

TECHNICAL FIELD

Embodiments of the present disclosure relate generally to training devices for medical procedures. More specifically, the present disclosure relates to training devices, systems, and methods for urological procedures.

BACKGROUND

During urological procedures, surgeons must often navigate tortuous anatomy, strictures, and impacted stones using medical devices. Many surgeons learn and practice these skills in the operating room, including skills related to manipulation of a guidewire and catheter to navigate a patient's anatomy.

SUMMARY

Embodiments of the present disclosure relate to, among other things, a training device for medical procedures. Each of the embodiments disclosed herein may include one or more of the features described in connection with any of the other disclosed embodiments.

In one example, a training device for medical procedures may include a back, a front, a top, a bottom, a left side, and a right side, and a track including a main track portion and a plurality of diverting track portions extending from the main track portion. The training device may be positioned within a fixed coordinate system, such that movement along the track may be described in relation to its backward or forward component (e.g., movement along the x-direction), left or right component (e.g., movement along the z-direction), and top or bottom component (e.g., movement along the y-direction). The main track portion may extend from a back end proximate the back to a forward end proximate the front. The training device may further include a stricture device configured to adjust a width of the main track portion along a portion of the main track portion. The track may be a lumen and may be formed of tubing or another material suitable to define a pathway. The lumen may be closed (e.g., entirely enclosed around its circumference) or open (e.g., not entirely enclosed around its circumference). The track may have any cross-sectional shape, such as circular, oval, square, or another regular or irregular shape. In one embodiment, the track may be included in a track region. The track region may include a material surrounding the track. The track may be a recess in the material of the track region. In one embodiment, the track may be a U-shaped or semi-circular recess, with an open top surface. In one example, the track region may be enclosed on its upper surface by a cover.

The training device may additionally or alternatively include one or more of the following features: the main track portion may include at least one change in direction towards the left side and at least one change in direction towards the right side from the back end to the forward end; the change in direction towards the left side may be at least 90 degrees, and the change in direction towards the right side may be at least 90 degrees; the main track portion may include at least one change in direction towards the top and at least one change in direction towards the bottom from the back end to the forward end; the change in direction towards the top may be at least 30 degrees, and the change in direction towards the bottom may be at least 30 degrees. In one embodiment, changes in direction (e.g., towards the left, right, top, or bottom) may be measured relative to a previous direction of the track in a fixed coordinate system. The stricture device may include a plurality of cams rotatable to constrict the main track portion; the plurality of cams may be held within corresponding recesses in an upper surface of a material, with a first one of the plurality of cams on a first side of the track, and a second one of the plurality of cams on a second side of the track; the main track portion may include a partial blockage protruding into an interior of the main track portion; the diverting track portions may extend in a direction of the main track portion preceding a proximal end of the respective diverting track portion; the device may include an entry port and an exit port; at least a portion of an exterior wall of the track may include a clear material; the clear material may extend along a full length of a top portion of the track; the main track portion may be between 9-16 French; the diverting track portions may each include a closed distal end; and the track may include a recess in an upper surface of a material surrounding the track.

In another example, a training device for urological procedures may include: a back, a front, a top, a bottom, a left side, and a right side; an elongated track extending from a back end proximate the back to a forward end proximate the front; and a stricture device configured to adjust a width of the track along a portion of the track; wherein the track includes at least one change in direction towards the left side and at least one change in direction towards the right side from the back end to the forward end; and wherein the track includes at least one change in direction towards the top and at least one change in direction towards the bottom from the back end to the forward end.

The training device for urological procedures may additionally or alternatively include one or more of the following features: the device may include an entry port proximate the back end and an exit port proximate the forward end; the elongated track may include a main track portion and a plurality of diverting track portions extending from the main track portion; the change in direction towards the left may be at least 90 degrees, and the change in direction towards the right may be at least 90 degrees; the change in direction upwards may be at least 30 degrees, and the change in direction downwards may be at least 30 degrees; and the stricture device may include a plurality of cams rotatable to constrict the track.

In yet another example, a training device for urological procedures may include a track extending from a back end to a forward end, wherein the track includes a continuous main track portion and a plurality of diverting track portions extending from the main track portion; and a stricture device configured to adjust a width of the main track portion along a portion of the main track portion; wherein the track includes at least one change in direction towards the left and at least one change in direction towards the right from the back end to the forward end; and wherein the track includes at least one change in direction upwards and at least one change in direction downwards from the back end to the forward end.

The training device for urological procedures may additionally or alternatively include one or more of the following features: the track may include a recess in an upper surface of a material surrounding the track; a top surface of the track may be covered by a clear material; the stricture device may include a plurality of cams rotatable to constrict the continuous track portion; the diverting track portions may extend in a direction of the main track portion preceding a proximal end of the respective diverting track portion; the change in direction towards the left may be at least 90 degrees, the change in direction towards the right may be at least 90 degrees, the change in direction upwards may be at least 30 degrees, and the change in direction downwards may be at least 30 degrees.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description serve to explain the principles of the disclosure.

DETAILED DESCRIPTION

The present disclosure is drawn to medical training devices, systems, and methods. The exemplary training devices described herein assist in preparing users for a variety of challenges they may face during real procedures on a patient. In this disclosure, a "user" may be any person completing the described action (e.g., surgeon, medical student, technician, nurse, etc.). In addition, the term "distal" refers to a position farther away from a user, and the term "proximal" refers to a position closer to the user.

The disclosed training devices may train users for any procedure that requires navigation of a guidewire, catheter, or other medical device through a lumen of a patient, and may be particularly useful to prepare users for urological procedures. For example, the training devices may prepare a user to perform procedures involving the kidneys, ureters, bladder, urethra, and male reproductive organs. In one application of the disclosed training device, a user practices for real procedures by navigating an angled guidewire and angled catheter through a track of the device. Reference will now be made in detail to embodiments of the present disclosure, examples of which are illustrated in the accompanying drawings.

Figure 1:
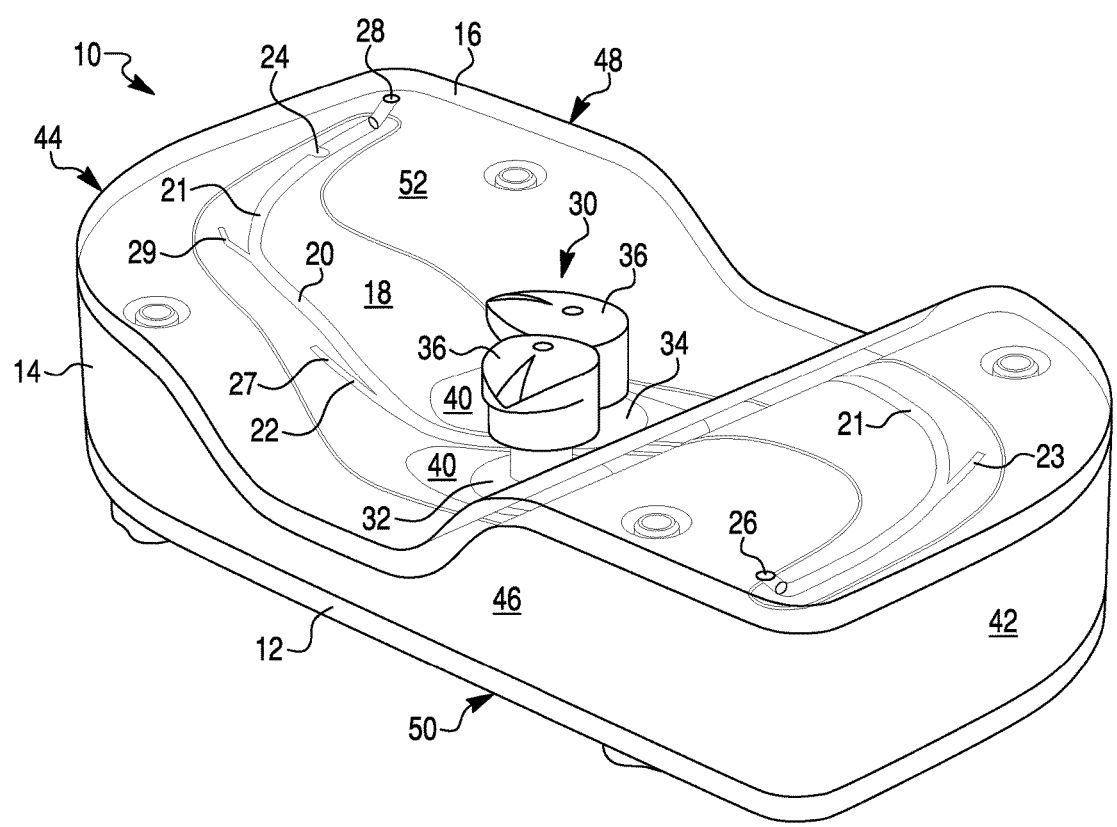
FIG. 1 is a perspective view of a training device, according to an exemplary embodiment.

Referring to FIG. 1, a training device 10 may include a base 12, a body portion 14, a track region 18 with a track 20, and a cover 16. In general, the device 10 may include a back 42, a front 44, a left side 46, a right side 48, a bottom 50, and a top 52. The track 20 may extend from a back end proximate the back 42 to a front end proximate the front 44.

The base 12 may support the device 10 and may be about 18 in (45.7 cm) long and about 12 in (30.5 cm) wide. In other embodiments, the base 12 may be between 16-20 in (40.6-50.8 cm) long and between 10-14 in (25.4-35.6 cm) wide. However, the base may be any dimension or shape suitable to support a track. The body portion 14 may lie between the base 12 and cover 16 and may be made of any material. In one embodiment, the body portion 14 is made of silicone.

The device may further include a track region 18, which includes a track 20. The track region 18 may be a material surrounding the track 20. In one embodiment, the track 20 may be a recess in the material of the track region 18. The track 20 may be a U-shaped or semi-circular recess, with an open top surface. The track region 18 may be enclosed on its upper surface by a cover 16.

In one embodiment, the cover 16 includes a clear material to allow the user to see movement of one or more medical devices along the track 20. The interior of the full length of the track 20 may be visible to a user through the clear cover 16. In one embodiment, the clear cover 16 may form a portion of the exterior wall of the track 20. The clear portion may extend along a part of the length of the track 20 or along the entire length of track 20.

The track region 18, and therefore the outer surfaces of track 20, may be made of a material that retains its shape absent an outside force, but that can be punctured by a guidewire or other medical device. In one embodiment, the track region 18 includes silicone or another material that is malleable or that may be punctured by a medical device to simulate real patient tissue.

The track 20 may include a main track portion 21, an entry port 26, an exit port 28, and a plurality of diverting track portions 22. The main track portion 21 may be continuous along its path, although it may include narrowed portions or partial blockages. In one embodiment, the unrestricted portions of main track portion 21 may have a diameter of 11 French, although any size diameter may be used (e.g., between 1-4 French, 5-8 French, 9-12 French, 13-16 French, 17-21 French, etc., or any subrange or combination of ranges).

The entry and exit ports 26, 28 may be angled relative to the main track portion 21, as shown in FIG. 1, such that the track 20 is accessible through the upper surface of cover 16. In one embodiment, the entry port 26 and exit port 28 may be holes or openings through the cover 16 connecting an exterior of the device 10 to the ends of main track portion 21. However, in another embodiment, the main track portion 21 may continue along its natural path near its end points, and the entry and exit ports 26, 28 may be located on side surfaces of the device 10. In one embodiment, the track 20 may be filled with water or another liquid to simulate the environment within a patient. In this embodiment, the entry and exit ports 26, 28 may include appropriate valving, for example, Luer connections to facilitate entry and exit of medical devices.

The main track portion 21 may be shaped to prepare users for a variety of challenges they may face during an actual patient procedure. The main track portion 21 may extend from a first end proximate entry port 26 to a second end proximate exit port 28. The first end may be referred to as the back end (near back 42 of device 10), and the second end may be referred to as the forward end (near front 44 of device 10), such that medical devices proceed along the track 20 in a forward direction from the back end to the forward end.

Figure 2:
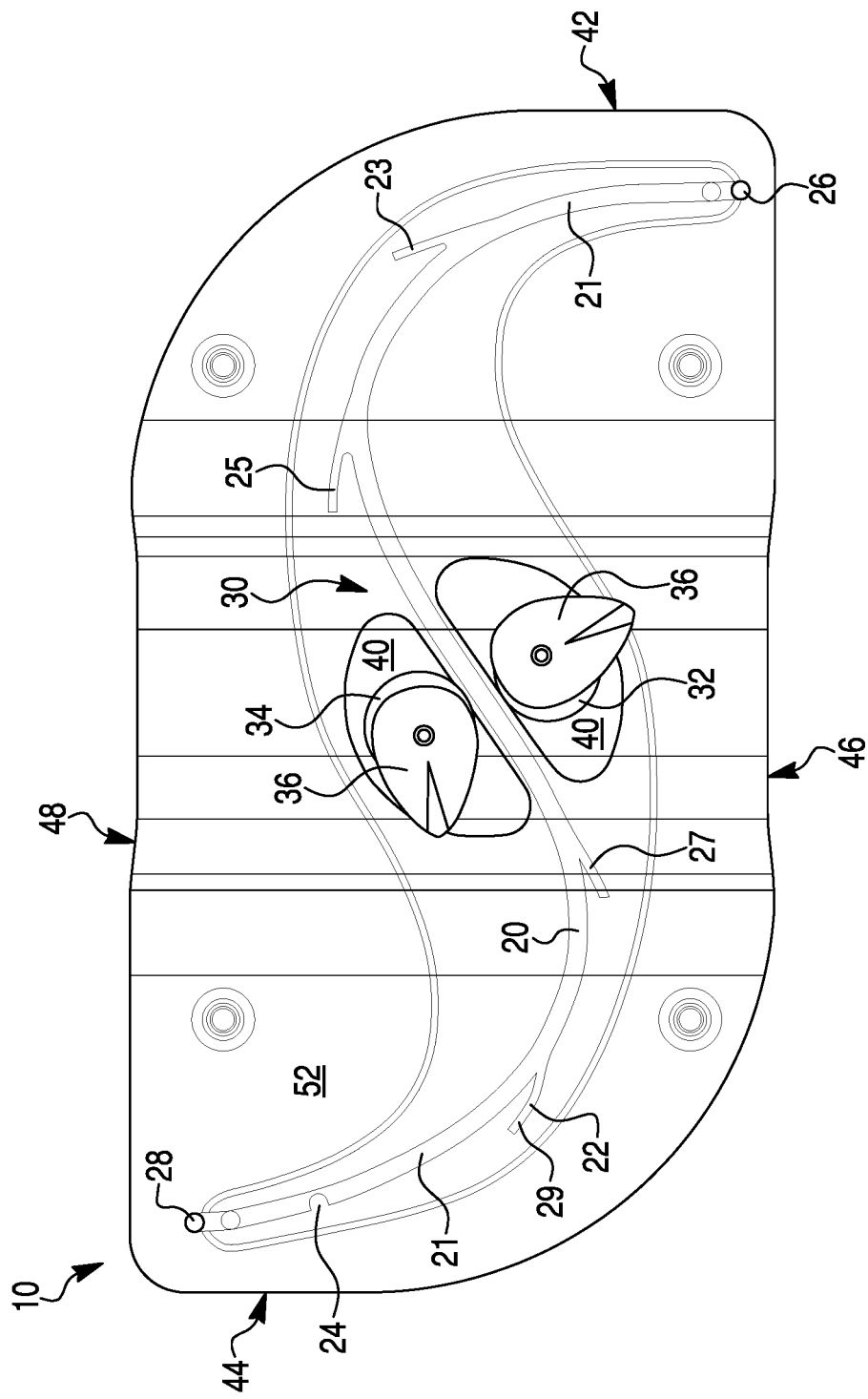
FIG. 2 is a top view of the training device of FIG. 1, according to an exemplary embodiment.

Referring to FIG. 2, in one embodiment, the main track portion 21 includes at least one change in direction towards the left and at least one change in direction to the right from the back end to the forward end. In other words, the main track portion 21 may form an "S" shape from a top view. In another embodiment, the change in direction to the right may occur before the change in direction to the left, still forming an "S" shape (although backwards from a top view).

A configuration with at least two curves, one in each direction, allows the training device 10 to prepare users for real patient lumens that may include curves in both directions. The change in direction may be any change in direction towards the right or left, relative to a reference direction. The reference direction may be, for example, a straight line extending from the previous direction of the main track portion 21 in a fixed coordinate system. The changes in direction may additionally or alternatively be relative to the left side 46 and right side 48 of the device 10. In some exemplary embodiments, the change in direction towards either side may be: at least 15 degrees, at least 30 degrees, at least 45 degrees, at least 60 degrees, at least 75 degrees, at least 90 degrees, at least 105 degrees, at least 120 degrees, at least 135 degrees, at least 150 degrees, at least 165 degrees, or at least 180 degrees.

Referring to FIG. 1, the main track portion 21 may further include at least one change in direction upwards and at least one change in direction downwards from the back end to the forward end. In other words, from a side view, the track may form a "U" shape between its endpoints. The "U" shape may extend below the plane of the start and end points of the track 20, as shown in FIG. 1, resulting in the change in direction downwards occurring before the change in direction upwards when travelling from the back end to the front end of the main track portion 21. However, in another embodiment, the "U" shape may extend above the plane of the start and end points, such that the change in direction upwards occurs prior to the change in direction downwards when travelling from the back end to the front end.

Similar to the changes in direction to the left and right, a configuration with at least two curves, one in the upwards direction and one in the downwards direction, allows the training device to prepare users for real patient lumens that may include curves in both directions. The change in direction may be any change in an upwards or downwards direction, relative to a reference direction. The reference direction may be, for example, a straight line extending from a previous direction of the main track portion 21 in a fixed coordinate system. The changes in direction may additionally or alternatively be relative to the top 52 and bottom 50 of the device 10. In some exemplary embodiments, the change in upwards or downwards direction may be: at least 15 degrees, at least 30 degrees, at least 45 degrees, at least 60 degrees, at least 75 degrees, at least 90 degrees, at least 105 degrees, at least 120 degrees, at least 135 degrees, at least 150 degrees, at least 165 degrees, or at least 180 degrees. The change in direction may be up to 180 degrees, for example, if the track changes from a straight up direction to a straight down direction.

As noted above, the changes in direction may be relative to a previous direction of the main track portion 21, relative to the left side 46, right side 48, top 52, or bottom 50, or relative to any other fixed coordinate system. In another embodiment, the changes in direction may alternatively or additionally be defined relative to the user of the medical device. It may be useful for the user to practice manipulating a guidewire and catheter, or other medical device, through a track 20 having a variety of different changes in direction relative to the user to practice for various scenarios that may arise during real patient procedures.

The changes in track directions described above (left, right, upwards, downwards) need not include only a change in one direction. For example, a certain change in direction may be partially a change in direction to the left and partially a change in direction downwards. That change in direction qualifies as both a change in direction towards the left (e.g., as viewed from above) as well as a change in direction downwards (e.g., as viewed from the side).

The track 20 may further include one or more diverting track portions 22 extending from the main track portion 21. In one embodiment, the track 20 includes four diverting track portions, although one, two, three, five, or more diverting track portions 22 may be included. The diverting track portions 22 may be elongated pathways formed as recesses in the material of the track region 18 and may extend at an angle from the axis of the main track portion 21. The diverting track portions 22 may include curves or angled portions. The diverting track portions 22 may have a length between 1 and 20 cm, between 4 and 16 cm, or between 8 and 12 cm. In one embodiment, the diverting track portions may reach a closed distal end within the track region 18. The closed distal ends may prevent further movement of a medical device.

In one embodiment, the diverting track portions 22 are positioned near a change in direction of the main track portion 21 as extensions of the preceding direction of main track portion 21. In other words, a proximal end of the diverting track portion 22 may connect to and be an extension of the main track portion 21 preceding the proximal end of the diverting track portion. Distal to the split between the main track portion 21 and the diverting track portion 22, the main track portion may continue to turn. The angle of the diverting track portion 22 relative to the main track portion 21 may therefore result in the diverting track portion 22 being the path a straight guidewire, catheter, or other medical device would naturally follow if the user does not manipulate the device to follow the change in direction of the main track portion 21. For example, referring to FIG. 2, a first diverting track portion 23 may be positioned proximate a first turn (to the left) of track portion 21, a second diverting track portion 25 may be positioned proximate a second turn (to the left) of track portion 21, a third diverting track portion 27 may be positioned proximate a third turn (to the right) of track portion 21, and a fourth diverting track portion 29 may be positioned proximate a fourth turn (to the right) of track portion 21. In this manner, the diverting track portions 22 pose challenges to the user, requiring the user to manipulate medical devices around turns without using the wall of the track portion 21 to guide movement. In one embodiment, one or both of a guidewire with an angled distal tip or a catheter with an angled distal tip may be used to navigate past the diverting track portions 22 to continue along the main track portion 21.

The track 20 may further include a blockage 24, which may represent a stone impacted in a ureter or any other restriction within a body lumen. The blockage 24 may be a partial blockage, such that a guidewire could pass the blockage 24 by going either around the blockage 24 or under the blockage 24. The blockage may protrude from a wall of the track 20 towards the interior of the track 20. The blockage 24 may be formed of the same material as the track region 18 or may be a different material placed within the track 20. The blockage 24 may train a user to navigate a guidewire or other medical device through passageways that have been significantly restricted.

The device 10 may further include a stricture device 30 configured to adjust a width of the main track portion 21 along a portion of the track portion 21. In one embodiment, the stricture device 30 is a pair of cams 32, 34. Each cam may be separately rotated to press against an exterior side of the track portion 21 and thus narrow the passageway. In one embodiment, both cams may be rotated to simultaneously press against both sides of track portion 21. The cams 32, 34 may each include a handle portion 36 that allows a user to rotate the cams 32, 34. In one embodiment, the stricture device 30 may be positioned in the U-shaped region between the ends of track 20, in the region after the main track portion 21 has changed direction towards the bottom 50 and before the main track portion 21 has changed direction towards the top 52 (relative to movement from the back 42 to the front 44).

Each cam 32, 34 may be positioned in a recess 40 of the track region 18. The recess 40 provides a location for the cams proximate to the exterior of main track portion 21, such that the cams can press against and deform the material of track region 18 between the recess 40 and the wall of the track portion 21. In another embodiment, the stricture device 30 may be a cuff positioned around the main track portion 21. The cuff may be adjustable to restrict the width of the passageway along a portion of main track portion 21.

In one embodiment, the device 10 includes a timer (not shown). The timer may facilitate training by allowing users to monitor the time to maneuver a distal end of a medical device from entry port 26 to exit port 28 of main track portion 21.

In an exemplary use of the training device 10, a user may navigate a guidewire and a catheter through main track portion 21. The guidewire and catheter may both have angled tips to allow the user to successfully complete a broad range of turns. First, the distal end of the guidewire may be inserted into entry port 26, and the guidewire may be backloaded into the catheter (e.g., the proximal end of the guidewire is inserted into the distal end of the catheter). The catheter may be advanced until the distal end of the catheter is near the distal end of the guidewire.

As the guidewire and catheter approach the first diverting track portion 23, the guidewire and catheter with angled tips may be manipulated such that forward motion of the devices follows the main track portion 21, and not the diverting track portion 23. Similarly, when approaching diverting track portions 25, 27, and 29, the user may angle the guidewire and catheter in a manner that causes the distal tips of the devices to follow main track portion 21 instead of the diverting track portions. Passing either the guidewire or catheter into the diverting track portion 23 may simulate puncture of a ureter or other body lumen, or the progression of the medical device along the wrong lumen within the patient.

Navigating a portion of track 21 narrowed by stricture device 30 may allow a user to practice specific techniques to pass a guidewire through a narrow passageway of a patient. For example, to prevent buckling of the guidewire, the catheter may be pushed forward through a portion of the stricture prior to the guidewire. The training device 10 further provides practice for navigating impacted stones or other objects in a patient's urinary track. The user may have to position the catheter carefully to be able to push the guidewire forward through a narrow space between the blockage 24 (e.g., representing an impacted stone) and the exterior wall of the main track portion 21.

In other embodiments, a user may navigate the main track portion 21 using a ureteroscope. The ureteroscope may have an active deflection mechanism at its distal tip. In another embodiment, a guidewire, with or without an angled tip, is used with the ureteroscope to navigate the main track portion 21.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

I claim:

1. A training device for medical procedures, comprising:
    a base, body portion, and cover;
    the base, body portion, and cover comprising a back, a front, a top, a bottom, a left side, and a right side;
    a track including a main track portion and a plurality of diverting track portions extending from the main track portion, wherein the main track portion extends from a back end proximate the back to a forward end proximate the front; and
    a stricture device configured to adjust a width of the main track portion along a portion of the main track portion, wherein the stricture device includes a plurality of cams rotatable to constrict the main track portion, wherein the plurality of cams are held within corresponding recesses in an upper surface of a material surrounding the track, with a first one of the plurality of cams on a first side of the track, and a second one of the plurality of cams on a second side of the track.

2. The training device of claim 1, wherein the main track portion includes at least one change in direction towards the left side and at least one change in direction towards the right side from the back end to the forward end.

3. The training device of claim 2, wherein the main track portion includes at least one change in direction towards the top and at least one change in direction towards the bottom from the back end to the forward end.

4. The training device of claim 1, wherein the main track portion includes a partial blockage protruding into an interior of the main track portion.

5. The training device of claim 1, wherein the diverting track portions extend in a direction of the main track portion preceding a proximal end of the respective diverting track portion.

6. The training device of claim 1, wherein the diverting track portions each include a closed distal end.

7. A training device for urological procedures, comprising:
    a base, body portion, and cover;
    the base, body portion, and cover comprising a back, a front, a top, a bottom, a left side, and a right side;
    an elongated track extending from a back end proximate the back to a forward end proximate the front; and
    a stricture device configured to adjust a width of the track along a portion of the track, wherein the stricture device includes a plurality of cams rotatable to constrict the main track portion, wherein the plurality of cams are held within corresponding recesses in an upper surface of a material surrounding the track, with a first one of the plurality of cams on a first side of the track, and a second one of the plurality of cams on a second side of the track;
    wherein the track includes at least one change in direction towards the left side and at least one change in direction towards the right side from the back end to the forward end; and
    wherein the track includes at least one change in direction towards the top and at least one change in direction towards the bottom from the back end to the forward end.

8. The training device of claim 7, wherein the device includes an entry port proximate the back end and an exit port proximate the forward end.

9. The training device of claim 7, wherein the change in direction towards the left is at least 90 degrees, and the change in direction towards the right is at least 90 degrees.

10. The training device of claim 7, wherein the change in direction upwards is at least 30 degrees, and the change in direction downwards is at least 30 degrees.

\* \* \* \* \*